Patented Aug. 1, 1950

2,516,859

UNITED STATES PATENT OFFICE 2,516,859

PROCESS FOR THE MANUFACTURE OF CELLULOSE ESTERS

Charles Doras, Le Peage, France, assignor to Societe "Rhodiaceta," Paris, France, a company of France No Drawing. Application January 30, 1947, Serial No. 725,284. In France February 8, 1946

9 Claims. (Cl. 260—225)

1

The present invention relates to the manufacture of cellulose esters by processes in which the esterified cellulose is soluble in the esterification mixture.

In the previously known processes of manufacture, the ester produced dissolves in the esterification mixture so that the first portions of the ester to be formed remain subjected to the action of the reagents until the whole of the cellulose has become esterified and dissolved. As a consequence of this, the first and major part of the cellulose ester formed undergoes a degradation which is harmful to the quality of the products finally prepared from such esters.

The present invention relates to a process for the esterification of cellulose by means of an esterification bath capable of dissolving the cellulose derivative obtained, the process being characterized by the fact that as the cellulose derivative is formed and goes into solution this solution is separated from the rest of the reaction mass and treated in such a way as to prevent any appreciable degradation of the cellulose derivative already formed, whereas in the non-completely esterified and undissolved residue, the reaction continues until esterification and solubilization of the whole of the cellulose takes place.

To stop the reaction in the solution of the esterified product, and to prevent this degradation of the ester, any known method can be used, such as for example destruction of the excess of the esterifying reagent or neutralization of the reaction catalyst.

In carrying out the process of the present invention, the esterifying bath can be brought in contact with the cellulose in any suitable apparatus for example an apparatus containing a filtering device through which the solution of the cellulose ester formed can be passed, in which, however, those cellulosic fibers which have not been completely esterified yet, are retained. These fibers are swollen and impregnated by the esterification mixture, and remain, therefore, exposed to the action of the esterifying agents so that their esterification continues. As soon as the cellulose ester is formed, it passes into solution and this solution then emerges from the filtering device and is treated to stop further reaction in the solution. Meanwhile the reaction in the residue goes on until all the cellulose which has been introduced into the reaction mixture is esterified and goes into solution as esterification proceeds.

The apparatus of the above mentioned type used for the separation of cellulose ester solution from the undissolved, not completely esterified cellulosic material may, for example, consist of a system of wire gauze, or filters consisting of textile material resistant to the esterification bath, layers of sand, metallic turnings or Raschig rings or the like.

The invention may be applied to continuous esterification processes and also to discontinuous esterification.

The following examples illustrate the method of the invention by way of example without limiting it in any respect. The parts are by weight unless otherwise stated.

Example 1

100 parts of cellulose which have been submitted to the usual pre-treatment with acetic acid and acetic anhydride, and if desired with a small quantity of sulphuric acid, are introduced into an apparatus furnished with a suitable stirring gear together with such quantities of acetic acid, acetic anhydride and sulphuric acid that the mixture contains a total amount of 1000 parts of acetic acid, 250 parts of acetic anhydride and 12 parts of sulphuric acid. After 45 minutes, the reaction material is fed to a filtering network formed of wire gauze and a felt of a textile material which is not attacked by the acetylation reagents. The cellulose acetate formed passes into solution and this solution flows through the filtering network. It is immediately treated with one tenth of its volume of aqueous acetic acid of 80% strength, and subsequently the cellulose acetate in this solution is precipitated by addition of a large excess of water. This acetate shows excellent properties; in particular its solution in a concentration of 6% in a mixture of methylene chloride (90 parts by volume) and ethyl alcohol (10 parts by volume) has a viscosity of 12 c. g. s. units, whereas an acetate prepared with the same quality of the reagents according to the known processes gives under the same conditions a viscosity of only 2.8 c. g. s. units.

Example 2

100 parts of cellulose which has undergone the usual pre-treatment are subjected to esterification in a bath containing a total amount of 1200 parts of acetic acid, 250 parts of acetic anhydride, 100 parts of butyric acid and 15 parts of sulphuric acid. After esterification for 40 minutes the reaction mass is introduced into a centrifugal filter in which the side of the bowl is provided with a very closely woven fabric filter which is not attacked by the esterification bath. The filtered liquid is collected and immediately treated with a solution of potassium acetate in acetic acid so as to neutralize the sulphuric acid and to prevent subsequent degradation of the acetobutyrate formed.

The aceto-butyrate thus prepared has a viscosity which is 100% higher than the viscosity of an aceto-butyrate obtained by carrying on esterification until the complete dissolution of the cellulosic starting material according to the usual methods.

*Example 3*

A mixture prepared in a continuous manner and containing 100 parts of cellulose previously subjected to a known pre-treatment, 109 parts of acetic acid, 250 parts of acetic anhydride and 14 parts of sulphuric acid is subjected to an acetylation process for 10 minutes in a continuous acetylation apparatus of the type described in U. S. Patent 1,859,579. The fibrous mixture emerging from this apparatus is supplied under a pressure of 40-50 kg. per square cm. by means of a piston pump to a column furnished with stacks of wire gauze of increasingly fine mesh, the first portions having a mesh of 2 to the square cm. and the last of 10 to 12.000 per square cm. The time during which the material is in this column amounts to 25 to 30% of the total esterification period.

The fibers which have not been completely acetylated are thus retained, whereas the homogeneous liquid solution of the acetyl cellulose in the esterifying bath is passed through the filter system. Only those fibres which have been esterified and dissolved pass through the outlet of the column.

The solution of the cellulose acetate in acetic acid which emerges from the column is immediately treated with acetic acid of 60% strength in an amount of ⅓ of its weight and is subjected to ripening in a continuous manner until the product has a titre of 55% combined acetic acid. It is then precipitated by the addition of a large quantity of water.

The secondary cellulose acetate thus obtained when dissolved in acetone in a concentration of 6% has a viscosity of 11 c. g. s. units. If the acetylation is carried out in a continuous manner in an apparatus with agitation without the use of the stacks of wire gauze and operating in such a manner that the final solution is free from non-acetylated fibres, then the secondary acetate has a viscosity of only 3 to 4 c. g. s. units in a 6% solution in acetone.

Instead of using a wire gauze system in the column described in this example, a system of other filter elements of decreasing permeability, which are capable of presenting an increasing obstruction to the fibres such as metallic turnings, Raschig rings, etc. may be used.

*Example 4*

A mixture which has been prepared in a continuous manner as mentioned in the preceding example and has been subjected to a similar preliminary acetylation is conveyed by means of a pump into a high-speed centrifuge. The admission of the material takes place near the periphery, and the course of the material is projected by the influence of the pump towards the center of rotation. The fibers have a density of the order of 1.5 whereas the density of the acetylating bath does not exceed 1.08, so that under these conditions, the fibers are thrown towards the periphery and are prevented from being removed through the centrally placed outlet, through which only the clear solution of the dissolved ester passes. Therefore, the fibers are removed only after esterification and complete dissolution.

As an additional measure of safety a filter can be interposed in the route of the exit of the acetic acid solution, but if the speed of rotation of the centrifuge and the rate of introduction of the material are suitably chosen this precaution is superfluous.

What I claim and desire to secure by Letters Patent is:

1. A method of producing a cellulose ester of lower aliphatic acids by mixing cellulose with an esterifying liquid comprising the anhydride of a lower aliphatic acid, a lower aliphatic acid and sulfuric acid catalyst; removing during esterification from the reaction mixture containing incompletely esterified undissolved cellulose and dissolved cellulose ester, esterification of which is completed, solution of said cellulose ester; rendering the removed solution incapable of causing degradation of the cellulose ester dissolved therein and continuing esterification in the reaction mixture.

2. A method of producing cellulose acetate by mixing cellulose with an esterifying liquid consisting of acetic anhydride, acetic acid and sulfuric acid catalyst; removing, during acetylation from the reaction mixture containing incompletely acetylated undissolved cellulose and dissolved cellulose acetate, acetylation of which is completed, solution of said cellulose acetate; rendering the removed solution incapable of causing degradation of the cellulose acetate dissolved therein, and continuing acetylation in the reaction mixture.

3. In a process for producing a cellulose ester of lower aliphatic acids according to the solution type process, the steps of continuously supplying a mixture of cellulose with an esterifying liquid comprising the anhydride of a lower aliphatic acid, a lower aliphatic acid and sulfuric acid catalyst, to a reaction mixture of cellulose and said esterifying liquid; continuously removing from said reaction mixture containing incompletely esterified, undissolved cellulose and dissolved cellulose ester, esterification of which is completed, solution of said cellulose ester; rendering the removed solution incapable of causing degradation of the cellulose ester dissolved therein and continuing esterification in the reaction mixture.

4. In a process for producing cellulose acetate according to the solution type process, the steps of continuously supplying a mixture of cellulose with an esterifying liquid consisting of acetic anhydride, acetic acid and sulfuric acid catalyst, to a reaction mixture of cellulose and said esterifying liquid; continuously removing from said reaction mixture containing incompletely acetylated, undissolved cellulose and dissolved cellulose acetate, acetylation of which is completed, solution of said cellulose acetate; rendering the removed solution incapable of causing degradation of the cellulose acetate dissolved therein and continuing esterification in the reaction mixture.

5. A method of producing a mixed cellulose ester of lower aliphatic acids by mixing cellulose with an esterifying liquid consisting of an anhydride of a lower aliphatic acid, lower aliphatic acids and sulfuric acid catalyst; removing during esterification from the reaction mixture containing incompletely esterified undissolved cellulose and dissolved cellulose ester, esterification of which is completed, solution of said cellulose ester; rendering the removed solution incapable of causing degradation of the cellulose ester dissolved therein and continuing esterification in the reaction mixture.

6. A method as claimed in claim 1, in which removal of the cellulose ester solution is effected by filtration of the reaction mixture.

7. A method as claimed in claim 1, in which removal of the cellulose ester solution is effected by subjecting the reaction mixture to centrifuging.

8. A method as claimed in claim 1, in which the separated solution of the cellulose ester is treated with a precipitating agent for said ester immediately after separation.

9. A method as claimed in claim 1, in which the separated solution of the cellulose ester is subjected to a ripening treatment before precipitation.

CHARLES DORAS.

REFERENCES CITED

The following references are of record in the file of this patent:

UNITED STATES PATENTS

| Number | Name | Date |
| --- | --- | --- |
| 1,859,579 | Bidaud | May 24, 1932 |
| 2,005,223 | Dreyfus | June 18, 1935 |
| 2,036,947 | McKee | Apr. 7, 1936 |
| 2,045,161 | Muller et al. | June 23, 1936 |
| 2,126,190 | Hofmann | Aug. 9, 1938 |
| 2,143,332 | Sindl et al. | Jan. 10, 1939 |
| 2,143,785 | Malm | Jan. 10, 1939 |
| 2,253,724 | New et al. | Aug. 26, 1941 |
| 2,315,973 | Malm | Apr. 6, 1943 |
| 2,353,255 | Malm et al. | July 11, 1944 |
| 2,372,565 | Fothergill | Mar. 27, 1945 |

FOREIGN PATENTS

| Number | Country | Date |
| --- | --- | --- |
| 213,631 | Great Britain | Apr. 3, 1924 |

OTHER REFERENCES

Ott, "Cellulose and Cellulose Derivatives," Interscience Publishers, Inc., New York (1943), pages 676 to 682.